United States Patent [19]

Groger et al.

[11] Patent Number: 5,415,943
[45] Date of Patent: May 16, 1995

[54] WOOD COMPOSITE MATERIALS AND METHODS FOR THEIR MANUFACTURE

[75] Inventors: Howard P. Groger, Gainesville, Fla.; Frederick A. Kamke, Blacksburg; Russell J. Churchill, Radford, both of Va.

[73] Assignee: American Research Corporation of Virginia, Radford, Va.

[21] Appl. No.: 24,752

[22] Filed: Mar. 2, 1993

[51] Int. Cl.⁶ .............................................. B32B 9/00
[52] U.S. Cl. ............................ 428/537.1; 428/58; 428/106; 428/286; 428/423.7; 428/425.1; 428/511; 428/541; 156/244.27; 156/330; 525/177
[58] Field of Search ............ 525/177; 156/332, 244.11, 156/244.27, 330; 428/286, 511, 537.1, 423.7, 58, 106, 425.1, 541

[56] References Cited

U.S. PATENT DOCUMENTS

| | | | |
|---|---|---|---|
| 3,285,872 | 11/1966 | Faber | 525/177 |
| 3,959,062 | 5/1976 | Hoh et al. | 156/313 |
| 4,126,504 | 11/1978 | Wolinski et al. | 156/310 |
| 4,205,107 | 5/1980 | Jaschke et al. | 428/58 |
| 4,865,912 | 9/1989 | Mitsumata | 428/285 |
| 4,957,968 | 9/1990 | Adur et al. | 525/74 |
| 5,151,466 | 9/1992 | Phadke | 525/177 |

*Primary Examiner*—Patrick J. Ryan
*Assistant Examiner*—Abraham Bahta
*Attorney, Agent, or Firm*—Dickstein, Shapiro & Morin

[57] ABSTRACT

Wood composite materials containing veneer layers interposed with a thermoplastic adhesive containing a polyester such as polyethylene terephthalate and other thermoplastic polymer show increased impact resistance. The composite material may be manufactured using an adhesive transfer method or film extrusion.

10 Claims, 2 Drawing Sheets

WOOD COMPOSITE MATERIALS AND METHODS FOR THEIR MANUFACTURE

BACKGROUND OF THE INVENTION

Many commercially available plywood panels are manufactured from wood veneers and have phenol formaldehyde resins used as the primary adhesive between the veneers. The plywood panels manufactured by this process are inexpensive to produce, but are prone to impact damage from dynamic loading, particularly at the edge of the panel.

Various adhesives have been used in an effort to improve the impact strength of plywood panels and other wood composite materials. See, e.g., U.S. Pat. No. 3,493,417 to Moren et al. which discloses an adhesive composition comprising a polyol compound, a polymerizable amineformaldehyde resin and a curing catalyst for that resin; U.S. Pat. No. 3,563,788 to Brown et al. which discloses an aqueous phenol-formaldehyde resole resin solution; U.S. Pat. No. 4,215,173 to Hubbard which discloses an alphacyanlacrylate as a bonding resin; U.S. Pat. No. 4,879,160 to Knudson et al. which discloses an isocyanate type resin adhesive; and U.S. Pat. No. 4,464,510 to Czvikovszky et al. which discloses an unsaturated polyester resin and a vinyl monomer.

In addition, various thermoplastic resins, such as polyesters and polyolefins, have been used as adhesives for laminates including between wood composite layers. See, e.g., U.S. Pat. No. 4,865,912 to Mitsumata; U.S. Pat. No. 3,817,822 to Dawes which discloses at least two plies of wood sheet bonded together with a polyethylene film cross-linked with an organic peroxide; U.S. Pat. Nos. 4,407,689 to Ohtsukai, 4,753,832 to Brown et al. and 4,948,640 to Givens et al., all of which disclose the use of a polyethylene based adhesive; U.S. Pat. Nos. 4,335,188 to Igi et al. and 4,318,837 to Streets et al., both of which disclose adhesive mixtures containing polyethylene terephthalate; and U.S. Pat. No. 4,062,907 to Sublett which discloses a modified polyester or blend which may contain polyethylene terephthalate.

The use of thermoplastic resins as adhesives for wood composites are desirable from the standpoint of providing good adhesive strength, but they normally increase the cost of manufacture of the composites. Additionally, the high melt temperature of some thermoplastic resins, e.g., polyethylene terephthalate which has a melt temperature of 260° C., as compared to the burn temperature of wood, e.g., 220° C., has resulted in the infrequent use of polyester resins as adhesives for wood composites.

SUMMARY OF THE INVENTION

The present invention provides a low cost wood composite panel having improved impact resistance. Impact resistance is improved by using as an adhesive blend, a composite adhesive which comprises about 20–80% by weight of a polyester or polyester blend, preferably containing polyethylene terephthalate, about 80–20% by weight of thermoplastic polyolefin, preferably polyethylene, and about 0–10% by weight of additives. Recycled polyethylene terephthalate and thermoplastic polyolefins may be used.

The composite is used to bond wood veneer layers resulting in a plywood composite panel having improved bonding and improved impact resistance. The composite blend is added to the surface of individual wood veneer layers by methods such as film extrusion and resin transfer pressing or molding. After the wood composite panel is formed, it may be subjected to post fabrication treatments, such as heating, to achieve additional increased bonding strength and impact resistance. Use of the adhesive resin mixture of the present invention reduces the cost of thermoplastic-wood composite material fabrication because the materials in the mixture are readily available as recycled stock. The methods of the present invention include steps, such as rapid resin transfer and film extrusion, that circumvent the temperature problems of the prior art, i.e., those caused by the higher melt temperatures of the resin component as compared to the burn temperature of wood.

Other features of the present invention will be apparent from the figures and the detailed description.

DETAILED DESCRIPTION OF THE INVENTION

Figure 1:
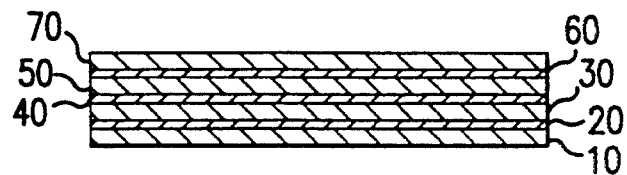
FIG. 1 is a cross-sectional view of a wood composite panel of the present invention containing alternating layers of veneer interposed with an adhesive resin.

A wood composite panel according to the present invention comprises alternating layers of wood veneer bonded together by a thermoplastic adhesive. The panel may contain two or more veneer layers, with adjacent layers bonded by an adhesive layer. FIG. 1, illustrates a wood composite panel 12 formed in accordance with the teachings of the invention and in which numerals 10, 30, 50 and 70 show veneer layers, while numerals 20, 40 and 60 show adhesive layers provided between adjacent veneer layers. A thermoplastic polymer, as described below, is used as the adhesive resin mixture 15 forming adhesive layers 10, 30, 50 and 70 thereby, providing the resultant wood composite panel 12 with a greater impact resistance over comparable wood composite panels of the same thickness, but formed with other known adhesives.

The thermoplastic adhesive 15 used in the wood composite of the present invention comprises a mixture of a polyester or polyester blend. Polyolefins, known for their adhesiveness, are preferably used as another polymer component in the mixture. Of the polyolefins, polyethylene (PE) is preferred, with linear low density polyethylene (L-LDPE) being specifically preferred. The polyester component of the adhesive may consist of a single polyester such as polyethylene terephthalate or it may consist of a blend of polyesters such as a blend containing PET and polybutylene terephthalate.

The adhesive mixture 15 used in the wood composite panel of the present invention may contain the polyester or polyester blend in a variety of compositions ranging from about 20% by weight to an extreme composition of about 80% by weight of the total adhesive mixture. About 80-20% of the adhesive by weight is a thermoplastic polyolefin and about 0-10% by weight is additives. A preferred composition contains the polyester or polyester blend in an amount of about 65 to about 70% by weight of the total composition. It is preferable that the polyester or polyester blend not be present in an amount more than 80% by weight because of the polyester's high melt temperature in comparison to the burn temperature of the veneer layers. If the resin mixture does not contain about 20% by weight of the polyester or polyester blend, the resin does not adhere well to the individual veneer layers, which results in poor bond formation between the veneer layers.

A preferred wood composite panel of the present invention uses as an adhesive, a blend containing 20-80%, by weight, of PET and 80-20% by weight of L-LDPE, both of which are available as recycled stock. The use of recycled stock decreases the cost of manufacturing the wood composite panel, without lowering the impact resistance of the panel.

The adhesive mixture 15 used in the composite panel of the present invention may also contain other additives which increase the adhesiveness of the resin for the individual veneer layers. Any of the additives known in the art may be incorporated into the adhesive composition, however, silane additives are preferred for their ability to increase adhesion. Generally, the additives are present in an amount not greater than 10% by weight of the total composition. If the adhesive composition contains additives in an amount greater than 10% by weight, the cost of this adhesive begins to approach a prohibitive level for use in a wood composite panel.

Another wood composite of the present invention contains a mixture of the adhesive of the present invention and wood materials. Specifically, the wood materials are in the form of chips and are mixed with an amount of adhesive determined to hold the chip materials together. The composite may then be pressed to obtain a desired thickness.

Figure 2:
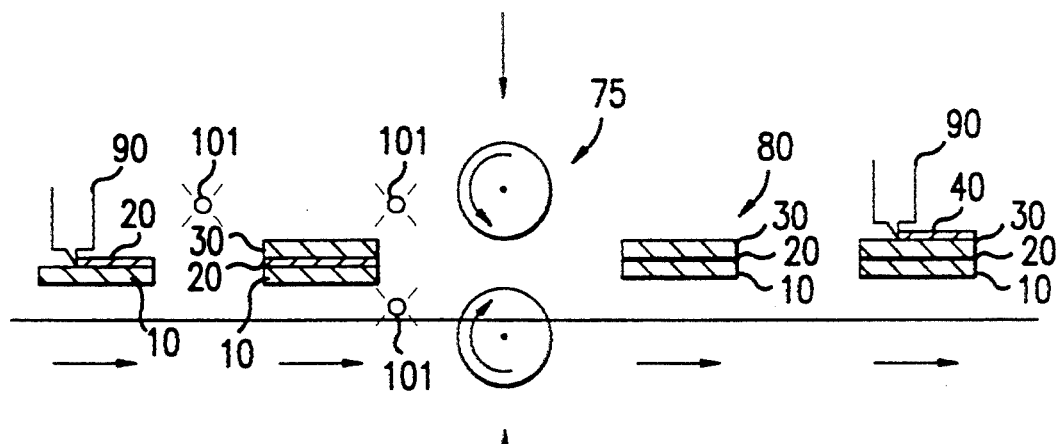
FIG. 2 is a schematic representation of a first manufacturing method for a wood composite panel of the present invention.

The wood composite panel of the present invention may be formed by a variety of manufacturing methods which result in individual veneer layers being bonded to each other by the adhesive 15. For example, in one embodiment of the invention shown in FIG. 2, a composite panel is formed by extruding from extruder 90 an adhesive resin mixture 15 as a film 20 onto a surface of a first wood veneer layer 10 and then pressing a second wood veneer layer 30 onto the first layer 10.

When the composite panel is formed by extruding the adhesive mixture 15 as a film 20 onto a first veneer surface 11, the extruded film 15 has a thickness ranging from about 0.002 to about 0.125 inches and preferably from about 0.015 to about 0.010 inches. When the thickness of film 20 is less than about 0.002 inches, the bond strength weakens and the impact resistance of the composite decreases. When the thickness of the film 20 is greater than 0.125 inches, the cost of producing the composite begins to approach a prohibitive level.

After the second wood veneer layer 30 is placed onto the film-containing layer of the first veneer layer 10, both veneer layers 10, 30 are then pressed in a roll press 75 to form the composite panel 80. This process may then be repeated for additional layers. The pressure and time needed for formation are well known and determined by the thickness of the materials as well as the moisture content of the veneer. When the desired composite panel 80 is a plywood panel, e g., either a 3 or 5 ply panel, each wood veneer layer having a thickness of about ⅛ inch, pressing in drum roll 75 occurs for about one minute at about 160 pounds per square inch. The successive wood veneer layers may have their direction of grain orthogonal to one another, in line with one another, or skewed.

If multi-layer composites are desired, they may also be formed by the steps of stacking the veneer layers interposed with adhesive 15 with the alternating veneer layers having the direction of the grain orthogonal to one another, in line with one another, or skewed, and pressing all layers simultaneously in a drum or roll press 75.

Generally the adhesive mixture 15 is heated prior to its transfer onto the veneer layer. Once the adhesive mixture 15 is sufficiently heated to a temperature greater than the melt temperature of the polyester or polyester blend, the adhesive mixture is then transferred onto the surface 11 of a first wood veneer layer 10 which is then joined with the surface 31 of a second veneer layer 30 and pressed in the drum or roll press 75.

The adhesive mixture 20 may be heated by any mechanism known in the art.

Figure 3:
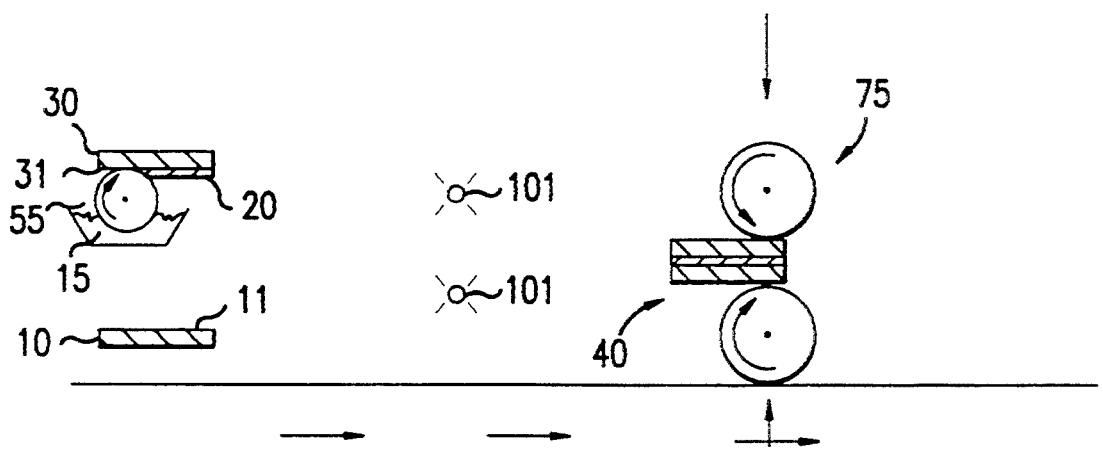
FIG. 3 is a schematic representation of a second manufacturing method.

FIG. 3 shows another method for fabricating the composite wood panel of the present invention which includes a different technique for transferring the adhesive 15 onto a veneer layer prior to pressing. In FIG. 3, the adhesive mixture 15 is heated and applied by a rotating drum 55, a or top veneer layer 30 is run over the top of rotating drum 55, which contains adhesive mixture 15, to effect adhesive transfer, while a second or bottom veneer 30 is run below the drum 55. The top veneer layer 30 then contains a layer of resin 20. Both veneer layers 10 and 30 are then placed into a roll press 75 to effect fabrication of the composite wood panel 40. Additional layers are fabricated by repeating the process and adding veneer layers 50 and 70 and adhesive layers 40 and 60 as described above. Again, the pressure and time for pressing is dependent on the thickness of the materials as well as the moisture content of the veneer. When the desired composite is a plywood panel, e.g., either 3 or 5 ply, with each wood veneer layer having a thickness of about ⅛ inch, each of the layers are pressed at 160 pounds per square inch for 5 seconds.

Figure 4:
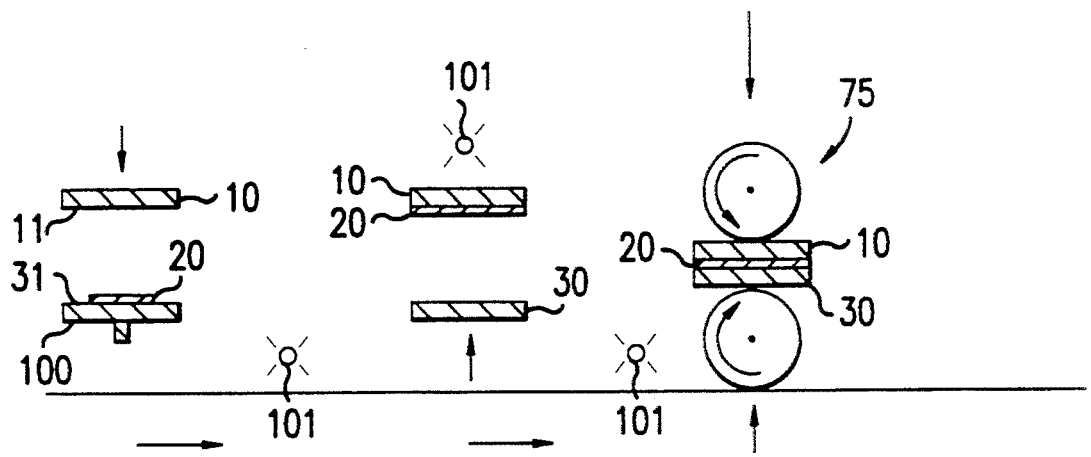
FIG. 4 is a schematic representation of a third manufacturing method.

In another alternative embodiment, shown in FIG. 4, the adhesive mixture 15 is first placed on an electric steel plate 100 and then heated by the electric steel plate. Transfer of the adhesive mixture occurs when a first veneer layer 10 is then pressed onto the melted adhesive mixture. The first veneer surface 11 is then removed and pressed onto a second veneer surface 31. Pressing usually occurs in roll press 70 in the same manner as described above.

In any of the above-described methods, the veneer layers interposed with adhesive may be kept under an infrared light 101, prior to entry into the roll press 75. The infrared light helps to maintain the adhesive above its melt temperature. However, because wood burns at 220° C. during extended periods of exposure, the adhesive transfer step must occur fairly quickly.

Another preferred step in the manufacturing process includes preheating the wood veneer layers 10, 30 prior to adhesive transfer. This allows for enhanced bonding between the adhesive and veneer layer. An alternative to preheating the veneer layers is depositing a silane material onto the veneer surface prior to adhesive transfer. Use of the silane material not only improves the bonding of the adhesive, but also eliminates the need for a preheating step.

The composite panel of the present invention is not limited to two veneer layers bonded together by a thermoplastic adhesive layer. Additional layers of veneer bonded with adhesive may be added to the composite panel until a desired thickness is achieved. Thus although FIG. 1 shows a four ply (layer) panel, this is merely illustrative of the invention. The desired thickness of the composite panel varies with the intended use of the composite.

Additional increased impact resistance may be achieved by post-fabrication heating of the composite wood panel formed according to any of the above-described methods. The post-fabrication heating of the composite will be conducted at a temperature below the combustion temperature of wood. Preferably the composite is heated in an oven having a temperature approximately 180° to approximately 200° C. for up to ten minutes to achieve increased impact resistance.

Figure 5A:
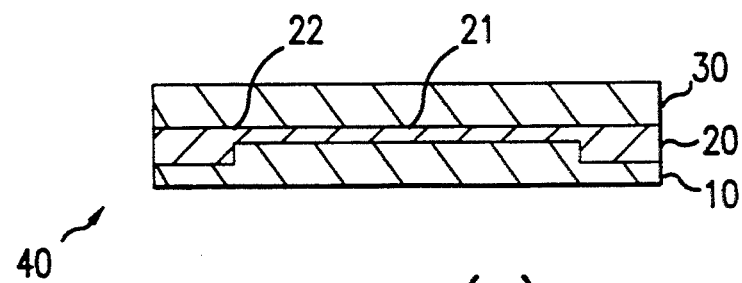
FIG. 5 (a) is a cross-sectional view of a first modified wood panel of the present invention.
FIG. 5(b) is a cross-sectional view of a second modified wood panel of the present invention.
Figure 5B:
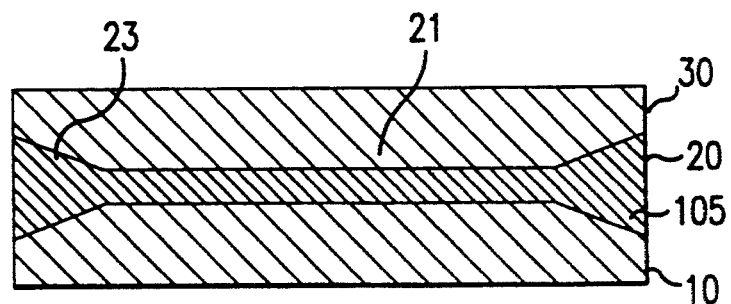

A further increase in impact resistance may be attained by increasing the amount of adhesive present at an outer margin 105 of the veneer layer as shown in FIGS. 5(a) and 5(b) The panel shown in FIGS. 5(a) and 5(b) constructed by first compressing an outer edge margin of a first veneer layer 10 before coating this first wood veneer layer 10 with the adhesive blend 15. The outer margin of the wood veneer layer 10 may be compressed in a known multiple-window plywood press. The multiple window press is constructed to allow for compression of only an edge portion 105 of the wood veneer layer 10. Preferably, the outer 2–4 inches of the wood veneer layer 10, around the entire peripheral edge of layer 10 are compressed; however, the outer compression margin may vary depending on the intended use of the wood composite. Once the outer margin of the wood veneer layer is compressed wood, the adhesive 15 is then transferred onto the surface of the compressed veneer layer 10. This results in an adhesive layer 20 which is thicker at the outer margins 105 than at an inner portion 21 of the panel. As shown in FIG. 5(a) adhesive layer 20 may be formed of a thinner inner adhesive layer region portion 21 and a thicker outer adhesive layer portion 22, both of which are a given thickness. Alternatively, as shown in FIG. 5(b), adhesive layer 20 may be formed of a thinner adhesive layer portion or region 21 of a given thickness, and a thicker outer adhesive layer portion 23 which increases in thickness gradually from the inner portion 21 to an outer edge of the wood veneer. A second veneer layer 30 is then pressed onto the adhesive containing wood veneer layer 10. The increased amount of adhesive 20 at the outer margin 105 provides the composite panel with an increased impact resistance at the outer margin 105, without making the cost of manufacturing the composite wood panel prohibitive. The preferred wood composite panels constructed as shown in FIGS. 5(a) and 5(b) contain a thermoplastic adhesive layer 20 having a thickness of about 0.06 to about 0.030 inches at the outer margin 105 and a thickness of about 0.015 to about 0.010 inches in the inner portion 21 of the wood veneer layer. The panel shown in FIGS. 5(a) and 5(b) can be constructed using any of the adhesive application and panel pressing techniques described above in connection with FIGS. 2–4.

While preferred embodiments of the invention have been described and illustrated it should be apparent that many modifications can be made to the invention without departing from its spirit and scope. Accordingly, the invention is not limited by the foregoing description, but is only limited by the scope of the appended claims.

What is claimed is:

1. A wood composite panel comprising at least two veneer layers bonded together by an adhesive, said adhesive consisting of about 20–80% by weight of at least one of a polyester and polyester blend, about 80–20% by weight of thermoplastic polyolefin, and about 0–10% by weight additives.

2. The wood panel of claim 1, wherein said at least one of a polyester and polyester blend is at least one of polyethylene terephthalate and a blend containing polyethylene terephthalate.

3. The wood composite of claim 2, wherein said polyolefin is a polyethylene.

4. The wood composite panel of claim 3, where said polyethylene is linear low density polyethylene.

5. The wood composite panel of claim 4, wherein at least a portion of said polyolefin and said polyester are taken from recycled stock.

6. The wood composite panel of claim 2, wherein said polyethylene terephthalate is present in said adhesive in an amount of about 65 to about 70% by weight.

7. The wood composite panel of claim 6, wherein said additive comprises a silane coupling agent.

8. The wood composite panel of claim 1, wherein said wood composite panel has an outer peripheral margin and an inner region and wherein said adhesive layer is of varying thickness such that at said outer peripheral margin said adhesive layer is thicker than at said inner region.

9. The wood composite of claim 8, wherein said adhesive layer at said outer peripheral margin has a thickness of about 0.06 inches to about 0.03 inches and wherein said adhesive layer has a thickness of about 0.015 inches to about 0.010 inches at said inner region.

10. A wood composite panel comprising wood chips and an adhesive, said adhesive consisting of about 20–80% by weight of at least one of a polyester and polyester blend, about 80–20% by weight of thermoplastic polyolefin, and about 0–10% by weight additives.

* * * * *